April 18, 1967 L. WESCH 3,315,261

WIDE-BAND RADIO WAVE ABSORBER

Filed Dec. 19, 1961 6 Sheets-Sheet 1

INVENTOR:
LUDWIG WESCH
BY Kurt Kelman
AGENT

INVENTOR:
LUDWIG WESCH
BY Kurt Kelman
Agent

INVENTOR:
LUDWIG WESCH
BY Kurt Kelman
Agent

April 18, 1967 L. WESCH 3,315,261

WIDE-BAND RADIO WAVE ABSORBER

Filed Dec. 19, 1961 6 Sheets-Sheet 4

INVENTOR:

LUDWIG WESCH

BY Kurt Kelman
Agent

April 18, 1967 L. WESCH 3,315,261

WIDE-BAND RADIO WAVE ABSORBER

Filed Dec. 19, 1961 6 Sheets-Sheet 6

INVENTOR:
LUDWIG WESCH
BY Kurt Kelman
Agent

United States Patent Office
3,315,261
Patented Apr. 18, 1967

3,315,261

WIDE-BAND RADIO WAVE ABSORBER

Ludwig Wesch, Heidelberg, Germany, assignor to Eltro G.m.b.H. & Co. Gesellschaft fur Strahlungstechnik, Heidelberg, Germany Filed Dec. 19, 1961, Ser. No. 161,338
Claims priority, application Germany, Dec. 13, 1957, E 15,090; Apr. 21, 1961, E 20,973
6 Claims. (Cl. 343—18)

This is a continuation-in-part of my application Serial No. 779,518, filed December 9, 1958, now abandoned.

The present invention relates to electromagnetic wave absorbing devices and more particularly to an absorber sheet for camouflaging objects against detection by means of radar waves in a very wide frequency band.

Devices for preventing reflection of impinging electromagnetic waves may be effective according to different physical principles, as known in the art. They may be wave diffusion absorbers effective by dispersing or diffusing waves coming from a certain direction in different directions, as described, for instance, by Tiley in his U.S. Patent No. 2,464,006.

Other devices attenuate the waves penetrating into the device. A sheet which may be used as an absorber of this type is described by H. F. Argento in his U.S. Patent No. 2,814,298.

Resonance absorbers cancel electromagnetic waves by interference. Such a device is described by L. K. Neher in his U.S. Patent 2,656,535. All these absorber devices are effective to a sufficient extent only in a small frequency band.

I have described resonance absorber devices, which are effective in a wide frequency band, in my copending U.S. application Ser. No. 86,823, filed on February 2, 1961.

It is an essential object of my present invention to provide an absorber device effective in an exceptionally wide frequency band or in a frequency band comprising waves of different wavelengths which are cancelled or attenuated by absorber surface areas of different resonance or tuned to different wavelengths.

In my above mentioned application, I have disclosed strongly absorbing wide-band resonance absorbers for use in radar camouflaging, such absorbers being capable of suppressing waves in a relatively wide frequency range, for instance the radar waves of 0.5–10 cm., while having greatly reduced thickness, for instance 1–5 mm. The frequency range of absorbed wavelengths is determined by the equation relative wave band width $$B=\frac{\Delta\lambda_0}{\lambda_0} \qquad (I)$$

wherein $\lambda_0$ is the wavelength in free space which has the maximum attenuation (see arrows in FIG. 1) and $\Delta\lambda_0$ is the difference between the maximum and minimum wavelengths which are sufficiently attenuated, e.g. to 5 db, indicated by broken lines in FIG. 1. In conventional wave absorbers, the relative wave band attenuation width may, for instance, have values between 0.05 and 0.5.

If it is desired to obtain an absorber having a sufficient attenuation over a wide frequency band, experience has shown that all characteristics of the absorber, especially layer thickness and high-frequency constants, must be most accurately tuned for the wavelength in the highest attenuation range. The value of $\Delta\lambda_0/\lambda_0$ normally increases with increasing wavelength, i.e. the absorbed frequency band becomes wider when the wavelength becomes longer. As shown in FIG. 1, where $\Delta\lambda_0/\lambda_0$ is measured for an attenuation of 5 decibels, $\Delta\lambda_0$ is 1 cm. for a main wavelength of 3 cm., but $\Delta\lambda_0$ is about 5 cm. for a main wavelength of 9.3 cm.

I have now found that I can produce a thin absorber layer having a total attenuation with values between 5 and 40 decibels in a wide wave band by dividing the total area of the absorber into individual areas of different resonance. In this manner an absorber type may be used for each area, which has the optimum effect for the wavelength for which the area has resonance. Preferably, these areas have a width or radius between one half and five wavelengths of the median wave of the wave band to be suppressed.

Due to this division of the absorber sheet according to my present invention into different sets of surface areas, the effect of such as absorber is similar to that of a band filter as known in the high-frequency art. With such a band filter, a capacitive, i.e. a resistive, coupling occurs as well as a coupling via magnetic lines of forces.

In the case of my present invention, coupling between the different surface areas is effected by the electromagnetic waves of different lengths. In contrast to the electromagnetic waves of other frequency bands, waves in the centimeter band do not diffuse according to the same laws as light waves so that the optical reflection laws do not apply to centimeter waves. In the case of centimeter waves, so-called surface waves are spread into all directions from the spot where a wave impinges. These surface waves effect the coupling of the individual areas, which are resonance circuits. Since in an absorber, due to the high losses in the boundary layer, the surface waves are also strongly absorbed, it is obvious that the band width determining the path of the wave from its impingement point to the adjacent areas cannot be expanded as desired. I have found that, at a maximum dimension of each area of $\lambda/2$ to $5\lambda$, the coupling effect of the surface waves, by means of which the individual bands may interact, is sufficient. Under certain conditions, sufficient coupling may be achieved also by areas with a maximum dimension of up to $10\lambda$.

It is possible to vary the dimensions of the area of the absorbers in one set relative to those of the other set. If a symmetrical wave attenuation curve with maximum band width is to be obtained, an absorber has to be used for each area which has equal attenuation at its point of resonance in a frequency band for 3.2 cm. and 5 cm., for instance. Then the dimension is the same for each area, for instance 10 cm.$^2$. If the 3.2 cm. wave shall be more effectively attenuated, the corresponding set of absorber areas may be chosen, for instance, two times as large as the areas of the 5 cm. absorbers. If the resonance point of one absorber set has less attenuation than the resonance point of the second absorber set, then the area for the absorber with less attenuation must be chosen wider than the area of the absorber of higher attenuation.

Thus, the arrangement of the absorber sheet according to my present invention makes it possible to obtain an absorber which is effective over an extremely broad frequency band and besides, independently of the effect of the absorber at the point of the frequency band where the absorber has its highest resonance, to keep the extent of effect equal for each influenced wave range by a corresponding selection of the areas of the different absorber sets and thereby to obtain an essentially equal extinction over the whole frequency band.

The principles and practice of the present invention will be more fully understood in the following detailed description taken in conjunction with the accompanying drawing wherein FIG. 1 shows wave attenuation curves for absorbers tuned to different wavelengths;

Figure 1:
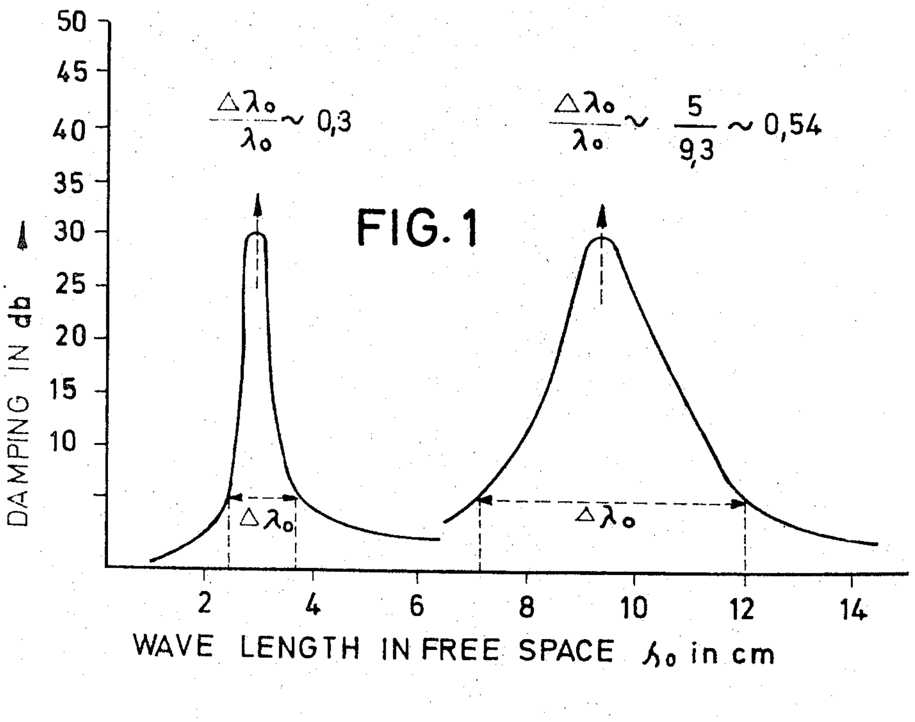

Referring now to the drawing, FIG. 1 illustrates the wave attenuation of two absorber layers tuned to different wavelengths in dependence on the wavelength. One of the absorbers is tuned for a maximum absorption at a wavelength of 3 cm. and the other absorber has a maximum attenuation at a wavelength of 9.3 cm. It is apparent from FIG. 1 that the width of the frequency band attenuated by an absorber increases proportionally to the wavelength. Presuming that the absorbers are of the same type, the attenuation maxima are about the same.

Figure 2:
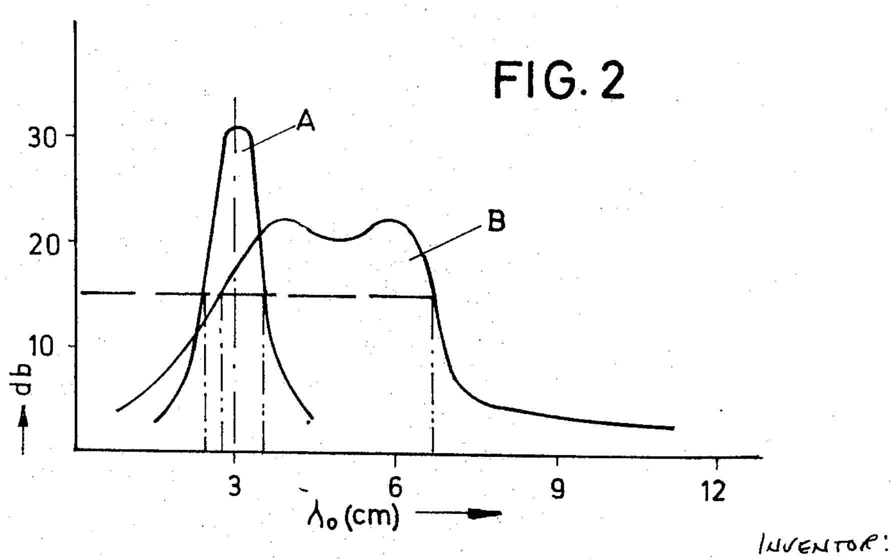
FIG. 2 is a diagram illustrating the attenuation curves A and B, respectively, of an absorber with precisely defined resonance and an absorber with two different, side-by-side resonance points.

FIG. 2 illustrates at A the attenuation curve in dependency on the wavelength in case of a known resonance absorber, e.g. a 377 ohms absorber with one point of resonance, at a wavelength of 3 cm. Since such resonance absorbers are effective only in close vicinity to the resonance wave, the attenuation curve rises and declines steeply. This shows that, when a minimum attenuation of 15 db is assumed as necessary, attenuation extends only over a very narrow frequency band, about from 2.4 to 3.5 cm.

At B, FIG. 2 illustrates the attenuation curve of an absorber constructed from two differently tuned resonance absorbers, e.g. as shown in FIG. 1. In this case, the point of resonance of one set of absorbers is at 3 cm. corresponding to curve A, and that of the second set at 6 cm. Also in this case, the attenuation curve rises relatively steeply and declines relatively steeply so that sufficient attenuation is obtained only within a range of wavelength of from about 2.7 cm. to 6.8 cm.

Figure 3:
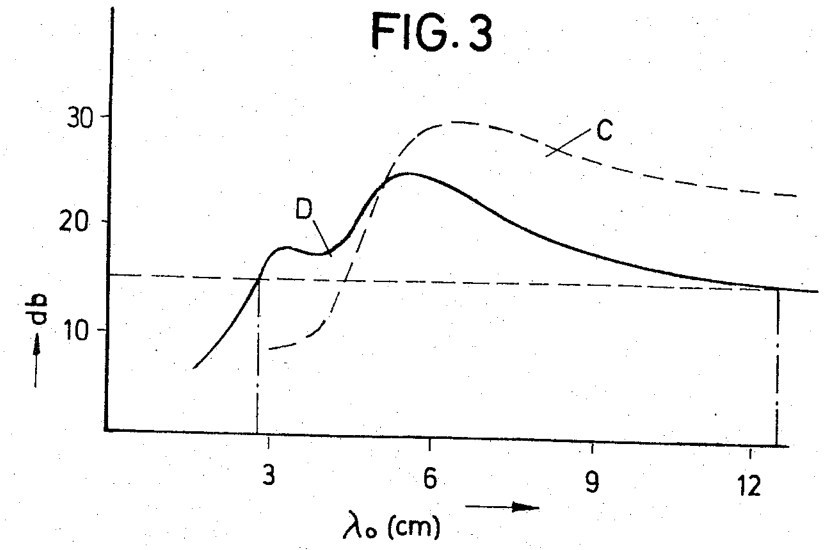
FIG. 3 is a diagram illustrating the attenuation curves C and D, respectively, of a conventional diffusion absorber without a precisely defined resonance point and of a resonance absorber combined according to the invention.

At D, FIG. 3 illustrates the combination of a resonance absorber having an attenuation curve A of FIG. 2 with a wave diffusion absorber. Curve C is the attenuation curve of this diffusion absorber, which rises steeply but declines very smoothly in the range of the longer waves. By using a mosaic of one set of resonance absorbers having an attenuation curve A and one set of diffusion absorbers having an attenuation curve C, an absorber is obtained, which shows an attenuation curve as illustrated at D in FIG. 3.

The diffusion absorber is so tuned that its main absorption is at the steeply declining margin of the frequency band within the range of short wavelengths. In this case, as may be seen from curve C, at a wavelength of 6 cm. its attenuation rises up to 30 db and extends with an attenuation of more than 15 db up to a wavelength of 30 cm. As is seen from curve D, the attenuation of an absorber comprising absorbers with respective attenuation curves A and C is at least 15 db between a wavelength of 3 and 12 cm.

Figure 5:
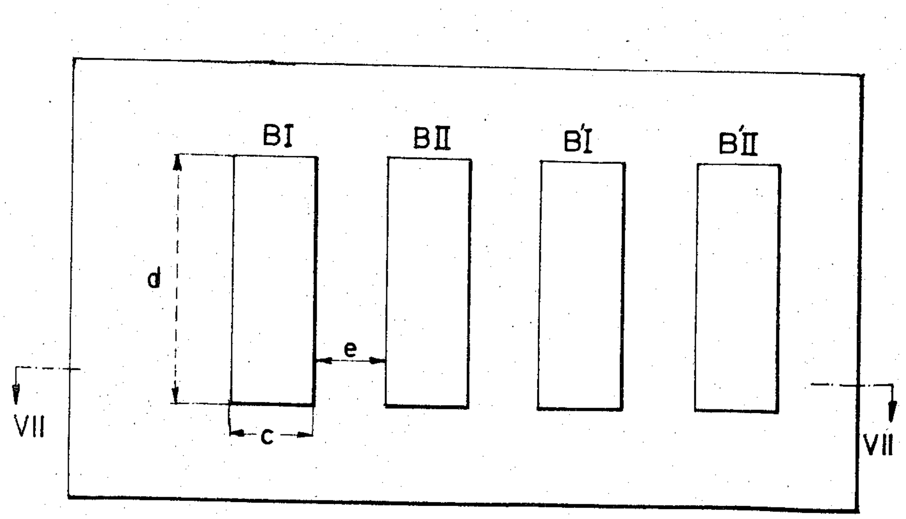
FIG. 5 is a schematic top view of one embodiment of an absorber according to the invention.

FIG. 5 illustrates a radio wave absorber surface which is divided into two sets of surface areas of different resonance. As shown in FIG. 5 the absorber consists of strips BI, BII, B'I and B'II of a given width *c* and a length *d*, the length *d* of all strips being for practical reasons equal. In practice, the strips may lie side-by-side so that the distance *e* becomes zero. If the strips are spaced apart, the distance *e* between these strips will normally be the same. The width *c* of the strips may be between 0.5λ to 10λ, preferably between 0.5λ to 5λ. The strips BI and B'I have a resonance tuned to one wavelength of the frequency band to be attenuated, whereas strips BII and B'II have a resonance tuned to another wavelength of said frequency band, i.e. strips BI B'I constitute one set of absorber surface areas and strips BII and B'II constitute another set of such surface areas. Each set of absorber surface areas may be constructed of any suitable absorber type.

Figure 6:
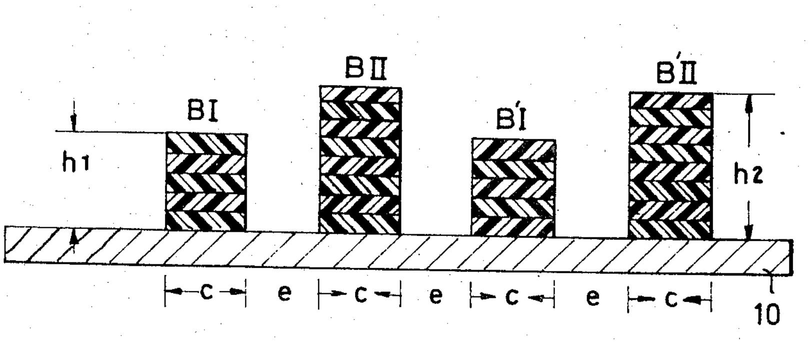
FIG. 6 is a section along line VII—VII of FIG. 5.

FIG. 6 is a sectional view of the absorber sheet according to FIG. 5 and shows schematically the regions BI, BII, B'I and B'II, which are applied on a reflecting base layer 10.

As shown in FIG. 6, the different resonance of absorbers BI, B'I and BII, B'II is obtained by the different thicknesses $h1$ and $h2$ of the respective strips forming these absorbers. The thickness $h$ of the strips is determined by the following equation $$h=\frac{(2n-1)\lambda_0}{4\sqrt{k_m'k'}} \qquad \text{(II)}$$

wherein $n$ is any positive integer, $k_m'$ is the relative magnetic permeability of the material and $k'$ is the relative dielectric constant of the material. Each absorber is shown to consist of a plurality of coatings.

Each set of absorbers of the absorber sheet according to my present invention is tuned to another wavelength of the frequency band to be attenuated by said absorber. This may be achieved by using the same absorber type for both sets of surface areas, but with different thicknesses λ/4 corresponding to the different wavelengths to which the respective absorber set is tuned or by using a different absorber type which may have essentially the same thickness for both sets, e.g. by changing the absorber material, or by using a 377 ohms absorber or an absorber according to Neher or other absorber types, e.g. as described below.

Figure 4:
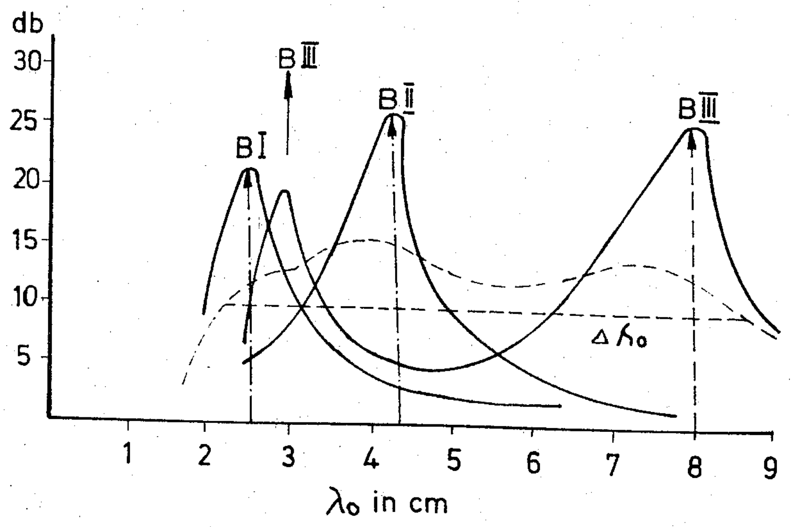
FIG. 4 shows the wave attenuation curves of an absorber having three different sets of surface areas tuned to different wavelengths of a wide frequency band.

In FIG. 4, the value of attenuation of each set of surface areas of an absorber sheet according to my present invention is illustrated dependent on the wavelengths of the frequency band and the resulting attenuation of the absorber sheet.

The areas BI may be tuned to a wavelength of 2.5 cm. while the areas BII may be tuned to a wavelength of 4 cm. It is, of course, possible to use wave absorber surface areas of more than two different resonances so that the absorber will be formed by surface areas BI, BII, BIII . . . and B'I, B'II and B'III . . ., as illustrated in FIG. 4. Such an arrangement will produce effective suppression of wave reflection in an even wider wave band. As shown in the broken line in FIG. 4, a damping of 10 db is achieved for a band width $\Delta\lambda_0$ of 7 cm.

As can be seen from FIG. 4, minima of attenuation appear between the individual sets of surface areas of different resonance and the entire attenuation curve over the wave band to be suppressed is somewhat uneven. The deviations in the curve are greater the farther apart in wavelength the tuning of the individual surface areas is chosen.

In accordance with one feature of this invention, the undesirable attenuation minima may be eliminated and the attenuation curve accordingly flattened by providing an additional absorber set BIII whose wave attenuation curve harmonic falls into the interspace between the two other absorber sets of different resonance. As appears from the above mentioned Equation (II), matching is obtained not only if $n=1$ but also for the harmonics when $n=2, 3$ . . . Thus, if a third absorber set BIII is tuned to the wavelength of 8 cm., high attenuation is also obtained for the wavelength of 2.66 cm., according to Equation (II).

In this manner, it is possible to match the minima between surface areas of different resonance in the attenuation curve, particularly with relatively short waves (high-frequencies), and to space the resonance of the individual surface areas farther apart.

In the embodiments of FIGS. 5 and 6, the absorber has been shown as sub-divided into strips of different resonance. Experiments have shown that this configuration involves practical difficulties, particularly if polarized waves are involved and the vector of the electrical field rotates. Therefore, in accordance with a preferred feature of this invention, the individual absorbing surface areas are not linear but are bounded by circular circumferences. This embodiment of the invention is illustrated in FIGS. 7 and 8.

Figure 7:
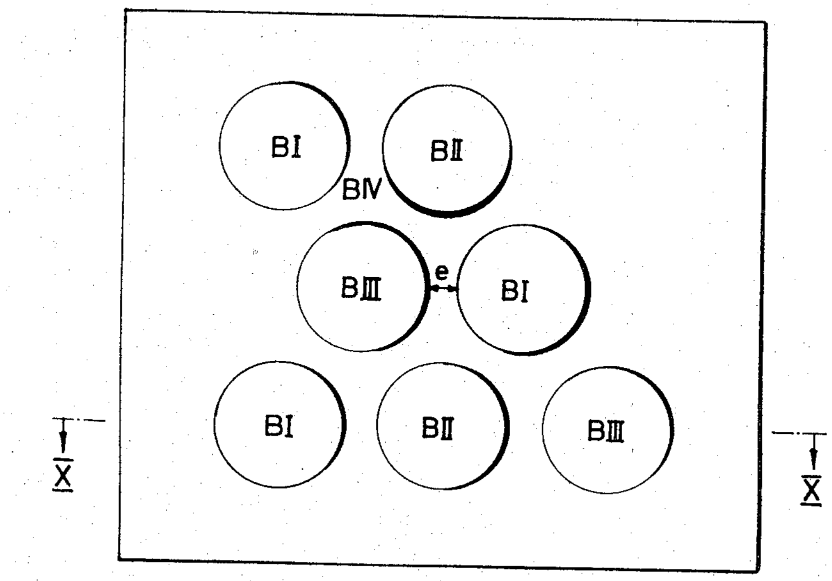
FIG. 7 is a schematic top view of another embodiment of an absorber according to the invention.

As shown in FIG. 7, the circular areas BI, BII and BIII may be of equal size and be spaced apart an equal distance *e*. However, it is preferred for the radii of the different areas to differ. The intermediate areas BIV between the circular areas BI, BII and BIII is so formed in accordance with the invention that they have a resonance matched to a quarter wavelength of that wave for which the highest attenuation in the entire wave band is desired. It is also possible to match areas BIV to a quarter wavelength of the wave at the end of the band to be suppressed. For instance, if it is tuned to a wave of 24 cm., the additional absorption effect of the harmonics $n=2, 3, 4$ . . . is also obtained.

Figure 8:
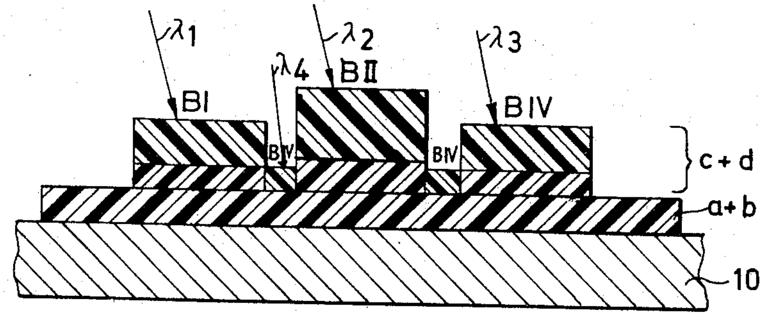
FIG. 8 is a section along line X—X of FIG. 7.

FIG. 8 shows the absorbers BI, BII, BIII and BIV in section. When all surface areas are of the resonance absorber type, phase reversing layers *a–b* are of the same thickness for the entire absorber and the thickness of the combined layers *a–d* is changed for the areas of different resonance by varying the thickness of coatings *c–d* for the longer wave regions. This may be accomplished quite simply by the use of suitable matrices if the coatings are sprayed, or molds in case rubber-like or bituminous materials are used for the layers.

Figure 9:
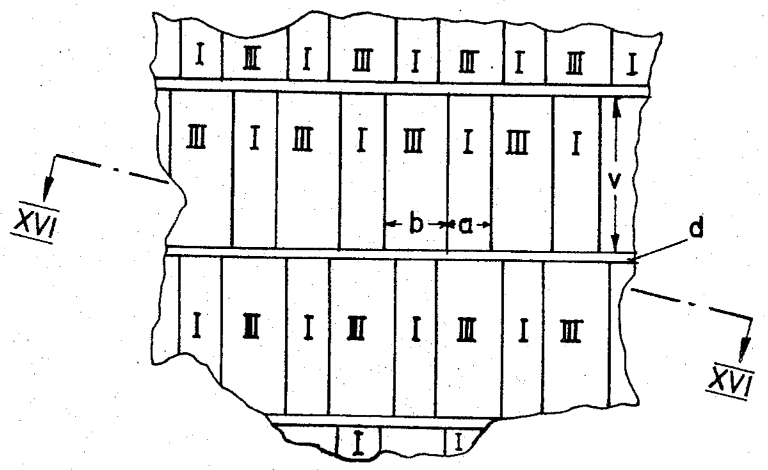
FIG. 9 is a partial top view of a broadband absorber laminate according to the invention, which has two sets of surface areas tuned to two wavelengths.
Figure 10:
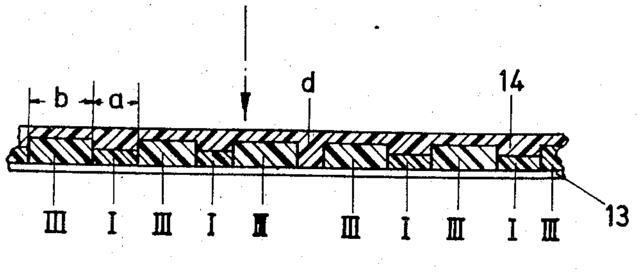
FIG. 10 is a section along lines XVI—XVI of FIG. 9.

FIGS. 9 and 10 illustrate a broadband absorber laminate according to the present invention, comprising two sets of surface areas, one of them, I, consisting of resonance absorbers tuned to a wavelength of $\lambda_0 I=3$ cm. and with an attenuation curve A, Fig. 2, and the other group of areas III consisting of diffusion absorbers with an attenuation maximum at $\lambda_0 III=6$ cm. and an attenuation curve C, FIG. 3. The areas are rectangular, the long side of the rectangle having a length of 15 cm. For areas I, this corresponds to a length of $5\lambda_0 I$ and for areas III to a length of $2.5\lambda_0 III$. The width of *a* of areas I is 1.5 cm.$=\frac{1}{2}\lambda_0 I$, whereas the width *b* of areas III is 3 cm.$=\frac{1}{2}\lambda_0 III$. The distance between two areas I corresponds to the width *b* of the areas III and is $1\lambda_0 I$ of the wavelength to which areas I are tuned, whereas the distance between two regions III corresponds to the width *a* of areas I and is $\frac{1}{4}\lambda_0 III$ of the wavelength to which areas III are turned. Between the rows formed by areas I and III abutting each other with the long sides of the rectangles, a distance *d* of 1 cm. is provided, being $\frac{1}{3}\lambda_0 I$ and $\frac{1}{6}\lambda_0 III$.

As is seen in FIG. 10, areas I and III are of different height and are arranged on a highly reflecting base layer 13, for instance a layer of synthetic resin filled with an aluminum powder. A smooth cover layer 14 is arranged over the absorbers I and III, for instance a synthetic resin, tar or similar layer having a low dielectric constant. This cover layer also fills in the gaps *d* between the rows so that a completely even surface is obtained.

Figure 11:
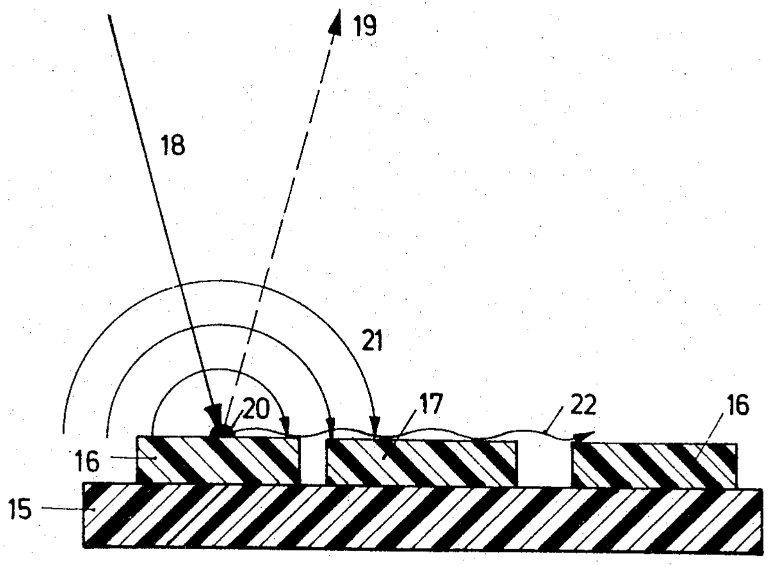
FIG. 11 is a section through an absorber according to the invention and schematically illustrates the behaviour of a wave impinging on its surface.

FIG. 11 illustrates a base layer 15, on which two sets of absorbers 16, 17 are arranged. Areas 16 are tuned to another wavelength than areas 17. The impinging wave 18 is partially reflected on the surface at point 20, as shown at 19. Besides partial wave 19 reflected according to optical laws, another wave front 21 starts from point 20 as a secondary wave. Moreover, surface waves 22 spread from point 20 over the surface of the whole absorber.

The absorber wave 21 and the spatial distribution of the surface waves 22 provide a coupling of all areas 16, 17 of the absorber. As a result of this coupling, region 17 also participates in the absorption of wave 18 impinging in area 16 at point 20.

Rhombic, diamond-shaped or elliptic areas may be combined with or used instead of circular absorber areas according to the invention. Deviations in the absorption curve can be equalized without difficulty by variations in the configurations of the areas.

Furthermore, if maximal attenuation of only 25 decibels and below is required, it is possible merely to roughen the metallic base reflector or to give it varying surface configurations rather than to try to obtain exact resonance, i.e. in the areas BI, BII, BIII and BIV for the wavelengths λ1, λ2, λ3, and λ4, as shown in FIGS. 7 and 8. If this is done, variable layer thicknesses across the entire absorber surface will automatically be achieved when the metallic base is coated with the resins forming the absorber layer or layers *a–d* or if the resins are sprayed onto the base. This will automatically produce different resonance throughout the absorber.

I have also found that best results are obtained if the different areas BI, BII . . . (FIGS. 5–8) are spaced apart a distance *e*, the interspaces causing diffraction of the incident waves so that a large portion of the incident wave energy is lost in the absorber material even without interference. I have found that such arbitrarily formed interspaces have the same effect in the wide wave band as a reduction in surface reflection. Therefore, the requirements for accuracy of the individual resonance areas are not too high.

The distance *e* between the resonance areas may vary between $\lambda/8$ and $5\lambda$, wherein $\lambda$ is the length of the median wave of the band to be suppressed in the material.

The difference in the resonance of the absorber areas to match different wave lengths results in a varying thickness of the absorber layer. This produces a layer of uneven surface and, preferably, the depressions in the layer surfaces are filled with a material of low relative dielectric constant and magnetic permeability and low loss angles. After an absorber is produced, it is very frequently necessary to change the highest absorptivity of the layer to a different wave range. This may be accomplished in accordance with one feature of the invention by providing a top layer over all layer areas. Preferably, the thickness of the top layer should substantially exceed half the thickness of the absorber layer proper.

It is also possible to apply additional coatings over the absorber, the total thickness of such coatings to be preferably below $\lambda/10$ of the median wavelength in the material. These additional coatings should have losses considerably below 1 and function as infrared absorbers or reflectors and/or as camouflage against visual detection. Coatings of this type are well known and form no part of the present invention, except as combined with the absorber layer thereof.

As has been more fully disclosed in my above mentioned prior patent applications, the absorber laminates can be applied to metallic base members by coating or flame spraying, natural and synthetic resins being used as layer materials and the high-frequency characteristics of the resins being influenced by suitable fillers, as described in my prior applications. Also, the resin laminates may be applied to flexible metallic supports, such as nets and the like, and these nets are then placed over the object to be camouflaged against radar detection. As long as the indicated features are met, the layers may be produced from any material, particularly natural and synthetic dielectric materials, such as plastics, rubber and like elastomers, cements and like bituminous coatings.

While specific embodiments have been illustrated and described, it will be understood that they have been given merely by way of example and that the principles of the invention may be broadly applied to produce extremely thin absorber laminates for radar camouflaging in a very wide wave band.

The following examples serve to illustrate the invention in more detail without limiting it thereto.

*Example I*

A combined absorber according to my present invention consisting of two sets of surface areas, one of which being of a resonance absorber type, the other one being of a wave diffusion absorber type, was produced as follows.

On an aluminum foil there were applied in closely spaced arrangement alternate areas consisting of an absorber A and of an absorber B as described above, each area having a rectangular surface with a length of 7 cm. and a width of 2.5 cm.

Areas A, being of a resonance absorber type, were produced of a layer consisting of a binder of a butadiene-acrylonitrile copolymer (as manufactured under the trade name Perbunan by Bayer, Leverkusen) filled with 46% by weight of magnetite having a particle size of less than 10 microns. The layer has a thickness $d=2$ mm.

Thereon a layer is applied consisting of a foil of polyvinyl chloride (PVC), having a thickness $d=5$ mm.

Areas B, being of a diffusion absorber type, were produced as follows. A first layer was applied onto the above mentioned aluminum foil and consisted of a plastic material having the following composition:

33.3 parts by weight polyamide (Genamid 250 produced by General Mills Inc., Kankakee, Illinois, U.S.A.)
66.7 parts by weight of epoxy resin BN 710 produced by Schering AG., Berlin, Germany
800.0 parts by weight of graphite
100.0 parts by weight of carbon black of Type A 31 produced by Degussa, Frankfurt/Main, Germany.

This material was applied with a thickness of 15 mm. and pressed into half spheres having a diameter of 2.5 cm. before solidification of the material. Subsequently the outer surface was made even resp. levelled by applying thereto a material having the following composition:

33.3 parts by weight of polyamide (Genamid 250 produced by General Mills Inc., Kankakee, Ill., U.S.A.)
66.7 parts by weight of epoxy resin BN 710 of Schering AG., Berlin, Germany
450 parts by weight of arenaceous quartz of a grain size of 1 to 3 mm.
450 parts by weight of arenaceous quartz of a grain size of 1 to 2 mm.

The areas B have a greater thickness than the areas A and, if desired, the differences in the thickness of both sets of areas may be levelled by applying onto the areas A, being of a resonance absorber type, a material having the following composition:

33.3 parts by weight of polyamide (Genamid 250 produced by General Mills Inc., Kankakee, Ill., U.S.A.)
66.7 parts by weight of epoxy resin BN 710 produced by Schering AG., Berlin, Germany
450 parts by weight of talcum
450 parts by weight of pumice.

The absorber according to my present invention as described in the present Example I is sufficiently effective over a wave band consisting of wavelengths of from 4 cm. to 25 cm.

*Example II*

Another combined absorber according to my present invention consisting of two sets of surface areas formed of two different types of absorbers, was produced as follows.

One absorber type was produced of 10 layers, having a dielectric constant increasing in the direction of the wave impingement.

The lowermost first layer consisted of the following basic mixture:

22 parts by weight of a modified alkyd resin manufactured under the trademark "Desmophen 1100" (3 adipic acid + 2 1,2,4-butanetriol + 2 butylene glycol) by Bayer, Leverkusen, Germany
8 parts by weight of a modified alkyd resin manufactured under the trademark "Desmophen 800" (5 adipic acid + 1 phthalic acid + 8 1,2,4-butanetriol) by Bayer, Leverkusen, Germany
5 parts by weight of a chlorinated diphenyl manufactured under trademark "Chlophen A 60" by Bayer, Leverkusen, Germany
8 parts by weight of xylene formaldehyde resin sold under the trademark "XFN" by Bayer
16 parts by weight butyl ethyl acetate
35 parts by weight toluene and
6 parts by weight collodion cotton manufactured under the trademark "E 950" by Bayer, Leverkusen, Germany.

75 parts by weight of this mixture were mixed with 25 parts by weight of graphite to yield a mixture of 100 percent. Besides, per 100 parts by weight of this mixture 10 parts by weight of an accelerator were added, the latter consisting of 87 parts by weight of a diisocyanate (produced by Bayer under the tradename "Desmodur TH 75"). This first layer is sprayed at a thickness of 2 mm. onto the object to be camouflaged.

The second layer was prepared from the same basic mixture as the first layer, the added amount tof the graphite however, being 20 parts by weight per 80 parts by weight of the basic mixture. The amount and type of the accelerator were the same.

The third layer was prepared from the same basic mixture as the first layer, adding, however, 15 parts of graphite per 85 parts of basic mixture.

The four layer was prepared from the same basic mixture as the first layer, with the only exception that 10 parts by weight of graphite were added to 90 parts by weight of basic mixture.

The fifth layer was prepared from the same basic mixture as the first layer, with the only exception that 5 parts by weight of graphite were added to 95 parts by weight of basic mixture.

The sixth layer was prepared from the same basic mixture as the first layer, with the only exception that 3 parts by weight of graphite were added to 97 parts by weight of basic mixture.

The seventh layer was prepared from the same basic mixture as the first layer, with the only exception that 2 parts by weight of graphite were added to 98 parts by weight of basic mixture.

The eighth layer was prepared from the same basic mixture as the first layer, with the only exception that 1 part by weight of graphite was added to 99 parts by weight of basic mixture.

The ninth layer was prepared from the same basic mixture as the first layer, with the only exception that 20 parts by weight of talcum were added to 80 parts by weight of basic mixture.

The tenth layer was prepared from the same basic mixture as the first layer, with the only exception that 5 parts by weight of finest microtalcum were added to 95 parts by weight of basic mixture.

Each of these layers is applied onto the foregoing layers with a thickness of 2 mm. and the 10-ply laminates are effective for a sufficiently decreased reflection over a wave range of 2.8 to 20 cm.

The other absorber areas were produced as follows: Balls of a low resistive material having diameters between 3 to 8 mm., on an average diameters of 6 mm., were prepared on the basis of foamed polystyrene in a ball-like shape. These balls were coated with a conductive coating by dipping them into or spraying onto them a lacquer of the following composition:

19.149 kg. of graphite GG
2.128 kg. of carbon black A 31 (produced by Degussa, Frankfurt, Germany)
42.553 kg. of TN-shellac solution 1:2 spirit
21.277 kg. of T 62=shellac solution 1:2 spirit
2.128 kg. of Bentone 34 1:5 in xylene
12.765 kg. of ethyl glycol These absorber balls were stirred to a pasty composition by mixing them with an epoxy resin and filled into molds, to form a layer with a jagged surface. The height of the surface wedges was 13 cm., the width of their base was 5 cm. The jagged surface was filled in with a layer so that an even surface was obtained. To this end polystyrene balls were used like those used in the preparation of the first layer, but without providing a conductive coating. These latter polystyrene balls were stirred in the same manner to a pasty composition by mixing them with an epoxy resin and the mixture cast into the wedges so that finally an even surface was obtained. This absorber layer is effective over a range of 5 cm. to 40 cm. at an average db value of 25.

The absorber device was constructed by series of alternate areas A, B, having a length of 20 cm. and areas A having a width of 15 cm. and areas B having a width of 7 cm. The absorber areas are arranged as shown in FIGS. 9 and 10.

What I claim is:

1. An electromagnetic wave absorber wall effective in a very wide frequency band in the range of centimeter wavelengths, comprising at least two sets of absorbers, the resonance of the absorbers of each set being tuned to a different wavelength and the resonance of the absorbers of at least one set being tuned to a wavelength within said frequency band, the absorbers being arranged in a mosaic pattern to form said absorber wall and adjacent surface areas formed by said sets of absorbers being tuned to different wavelengths, the surface areas having the same resonance being spaced apart by $\lambda_0/8$ to $5\lambda_0$, $\lambda_0$ being the wavelength in free space to which said surface areas are tuned.

2. An electromagnetic wave absorber wall effective in a very wide frequency band in the range of centimeter wavelengths, comprising at least two sets of absorbers, the resonance of the absorbers of each set being tuned to a different wavelength and the resonance of the absorbers of at least one set being tuned to a wavelength within said frequency band, the absorbers being arranged in a mosaic pattern to form said absorber wall and adjacent surface areas formed by said sets of absorbers being tuned to different wavelength, the largest linear extension of said surface areas ranging between $\lambda_0/2$ and $5\lambda_0$, $\lambda_0$ being the wavelength in free space to which the respective one of said surface areas is tuned.

3. An electromagnetic wave absorber wall effective in a very wide frequency band in the range of centimeter wavelengths, comprising at least one set of wave diffusion absorbers and at least one set of resonance absorbers tuned to a wavelength within said frequency band, the absorbers being arranged in a mosaic pattern to form said absorber wall and adjacent surface areas formed by said sets of absorbers being tuned to different wavelengths, the largest linear extension of said surface areas ranging between $\lambda_0/2$ and $5\lambda_0$, and the surface areas formed by each of said sets being spaced apart by $\lambda_0/8$ to $5\lambda_0$, $\lambda_0$ being the wavelength in free space to which the respective one of said surface areas is tuned.

4. The wave absorber wall of claim 3, wherein the absorbers in different ones of said sets are of different thickness whereby they form an uneven wall surface defining spaces between alternating ones of said absorber surface areas, and further comprising a covering layer filling said spaces and thereby levelling the wall surface, the covering layer consisting of a material having a low relative dielectric constant, low magnetic permeability and low loss angles.

5. The wave absorber wall of claim 4, further comprising a wave reflecting base layer supporting all of said absorbers.

6. The wave absorber wall of claim 3, wherein at least one set of absorbers consists of wave diffusion absorbers and at least one set of absorbers consist of resonance absorbers.

References Cited by the Examiner

UNITED STATES PATENTS

| | | | |
|---|---|---|---|
| 2,527,918 | 10/1950 | Collard | 343—18 |
| 2,822,539 | 2/1958 | McMillan | 343—18 |
| 2,870,439 | 1/1959 | Stinehelfer | 343—18 |

OTHER REFERENCES

Severin: "Nonreflecting Absorbers for Microwave Radiation," IRE Transactions on Antennas and Propagation, AP4, No. 3, pp. 385–392, July 1956.

CHESTER L. JUSTUS, *Primary Examiner.*

L. MYERS, G. M. FISHER, *Assistant Examiners.*